United States Patent [19]
Mazziotti

[11] Patent Number: 5,201,107
[45] Date of Patent: Apr. 13, 1993

[54] METHOD OF ASSEMBLING A CONSTANT VELOCITY UNIVERSAL JOINT

[75] Inventor: Philip J. Mazziotti, Toledo, Ohio

[73] Assignee: PMX Inc., Toledo, Ohio

[21] Appl. No.: 788,335

[22] Filed: Nov. 6, 1991

Related U.S. Application Data

[63] Continuation-in-part of Ser. No. 574,075, Aug. 29, 1990, abandoned.

[51] Int. Cl.$^5$ .................. B23P 11/00; F16D 3/224
[52] U.S. Cl. .................. 29/434; 464/145; 464/906
[58] Field of Search ............... 464/143–146, 464/906; 29/434, 441.1, 898.061, 898.062, 898.064

[56] References Cited

U.S. PATENT DOCUMENTS

| | | | |
|---|---|---|---|
| 1,975,758 | 10/1934 | Stuber | 464/145 |
| 2,579,356 | 12/1951 | Anderson | 464/144 |
| 3,789,624 | 2/1974 | Camosso | 464/144 |
| 3,919,861 | 11/1975 | Bellomo | 464/143 X |
| 3,982,840 | 9/1976 | Grosseau | 464/145 X |
| 4,358,283 | 11/1982 | Kumpar | 464/143 |
| 4,455,734 | 6/1984 | Yoshioka at al. | 464/906 X |
| 4,610,643 | 9/1986 | Krude | 464/143 |

Primary Examiner—Daniel P. Stodola
Assistant Examiner—William G. Battista, Jr.
Attorney, Agent, or Firm—Allen D. Gutchess, Jr.

[57] ABSTRACT

An outboard constant velocity universal joint for a steered wheel of a vehicle includes a one-piece, structurally-integral inner race and first shaft and a one-piece, structurally-integral outer race and second shaft. The inner race has an outer surface of partially spherical configuration. The outer race has a closed end and an open end with an inner surface of partially-spherical configuration and of constant radius extending from the open end to the closed end. The inner and outer races fit closely together in the manner of a ball and socket without any cage between the surfaces thereof. A cage or retainer is located in the closed end of the outer race with a convex outer surface substantially equal in length to the radius of the inner surface of the outer race. The cage has a plurality of fingers extending only into end portions of the grooves of the inner race. The fingers have outwardly-extending flanges extending into grooves of the outer race. The diameter of the first shaft does not exceed the diameter of the bearing balls so that the first shaft can be received in outer end portions of grooves of the outer race during assembly of the inner and outer races.

2 Claims, 3 Drawing Sheets

METHOD OF ASSEMBLING A CONSTANT VELOCITY UNIVERSAL JOINT

This application is continuation-in-part application of my U.S. application Ser. No. 574,075, filed Aug. 29, 1990, and now abandoned.

This invention relates to a constant velocity universal joint, particularly for use as an outboard joint in a front wheel drive shaft.

Constant velocity universal joints commonly have cages located between inner and outer races of the joints with the cages having openings in which the rolling elements or balls are retained. Particularly when such universal joints are used as outboard joints in vehicle front wheel drive shafts, the joints are subjected to axial forces as the wheels move up and down and considerable force is placed on the cage and the races. Over a period of time chatter, wear, and vibration result.

A constant velocity joint in accordance with the invention provides inner and outer races with curved grooves and a cage which does not extend between the outer surface of the inner race and the inner surface of the outer race. Rather, the center of curvature of the bottoms of the grooves of the inner race and the center of curvature of the bottoms of the grooves of the outer race are positioned relative to the center of curvature of the outer surface of the inner race and the inner surface of the outer race such that the balls in the grooves are urged toward a closed end of the outer race during operation. A cage is located at the closed end of the outer race, beyond the inner race and has fingers which extend into the grooves of the inner race and contact the rolling elements or balls to retain them in position as they are urged against the fingers. As such, the cage is not located between the outer and inner surfaces of the inner and outer races so that a close fit between them can be attained. Axial or other forces incurred during operation of the constant velocity joint are taken directly between the inner and outer races. Consequently, less chatter, wear, and vibration can result.

The inner surface of the outer race has a partially spherical, concave surface formed therein. The cage likewise has a partially spherical, convex surface which cooperates closely with a closed end portion of the concave surface so that the cage is guided and backed up by the closed end of the outer race during operation. The balls are urged toward the closed end by the configuration of the grooves and are engaged by fingers of the cage to maintain the balls in position during operation. Since none of the cage is located between the inner and outer races, the grooves can be of greater depth and slightly larger balls can also be employed. The cage is also stronger since the cage does not require wide openings which are larger than the balls.

Since the fingers of the cage extend only into the grooves of the inner race, it is not necessary to step the inner surface of the outer race to accommodate the cage, as set forth in my earlier application. Hence, the partially spherical surface of the outer race is all of one diameter and is much easier to machine or manufacture. The fingers of the cage have outwardly-extending flanges at their ends which extend into grooves of the outer race. These flanges provide extra area at the finger ends to assure that the cage fingers will contact the balls for angular positions of the universal joint.

In the new universal joint, the inner race and a first or drive shaft is of one-piece construction, being functionally and structurally integral. In addition, the outer race and a second or driven shaft are also of one-piece construction, being functionally and structurally integral. This has resulted in economies by eliminating special splines on the first shaft to connect to the inner race and/or by eliminating making the outer race and second shaft of separate parts with extra machining and fasteners required for assembly.

To achieve the one-piece construction of both of the inner and outer races and their respective shafts, the first shaft with the structurally-integral inner race has a diameter which does not exceed the diameter of the balls so that the first shaft can be turned at an angle such that it enters the grooves of the outer race at the open end thereof when pivoted to an angle beyond the normal maximum operating angle of the universal joint. Thus, by way of illustration, with the normal operating angle of 45°, for assembly purposes the first shaft is turned to a 50° angle by being partially inserted into the ends of the outer race grooves. This opens the inner and outer grooves on the opposite side sufficiently that the bearing balls can be inserted into the corresponding grooves. After one ball is inserted, the first shaft is moved out of the outer groove end and into the next one whereby a second bearing ball can then be inserted into the corresponding opposite grooves of both inner and outer races. This is repeated until all of the grooves are filled with the bearing balls.

The inner and outer races are initially assembled with one another by placing the first and second shafts in general alignment and moving the inner race into the outer race with the outer surface of the inner race extending through the grooves of the outer race until the inner and outer races are substantially on the same center of curvature. The inner race is then rotated to align the grooves thereof with the grooves of the outer race. The first shaft and inner race are then pivoted to move the first shaft into the open ends of the outer race grooves to place the first shaft beyond its maximum operating position, at which time the balls are inserted as described above.

It is, therefore, a principal object of the invention to provide a constant velocity universal joint, particularly for outboard joints of front wheel drive shafts, having the advantages discussed above.

Another object of the invention is to provide a constant velocity universal joint having an inner race and a first shaft of one-piece construction and an outer race and a second shaft of one-piece construction.

A further object of the invention is to provide a constant velocity joint of the type described in which the inner surface of the outer race is partially spherical with a constant radius of curvature throughout, from a closed end to an open end thereof.

Yet another object of the invention is to provide a constant velocity joint of the type described in which fingers of a cage extend into grooves of an inner race and have flanges extending partially into grooves of an outer race.

Many other objects of the invention will be apparent from the following detailed description of a preferred embodiment thereof, reference being made to the accompanying drawings, in which.

Figure 1:
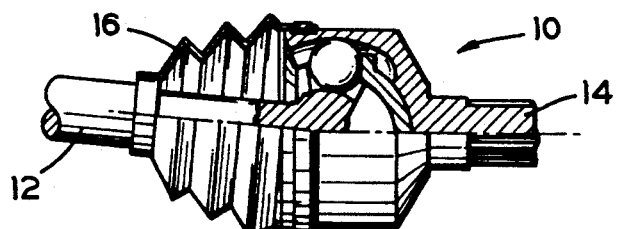
FIG. 1 is a schematic view in elevation, with parts in cross section, of an outboard constant velocity universal joint in accordance with the invention.

Referring to the drawings, and more particularly to FIG. 1, an outboard constant velocity universal joint according to the invention is indicated at 10 and connects a first, inboard or drive shaft 12 with a second, outboard or driven shaft 14. The inboard shaft is connected to a plunging universal joint (not shown) that is connected to the engine/transaxle. The outboard shaft 14 is connected to a wheel (not shown) and turns with the wheel around a fixed center. A flexible boot 16 retains lubricant within the universal joint 10.

Figure 2:
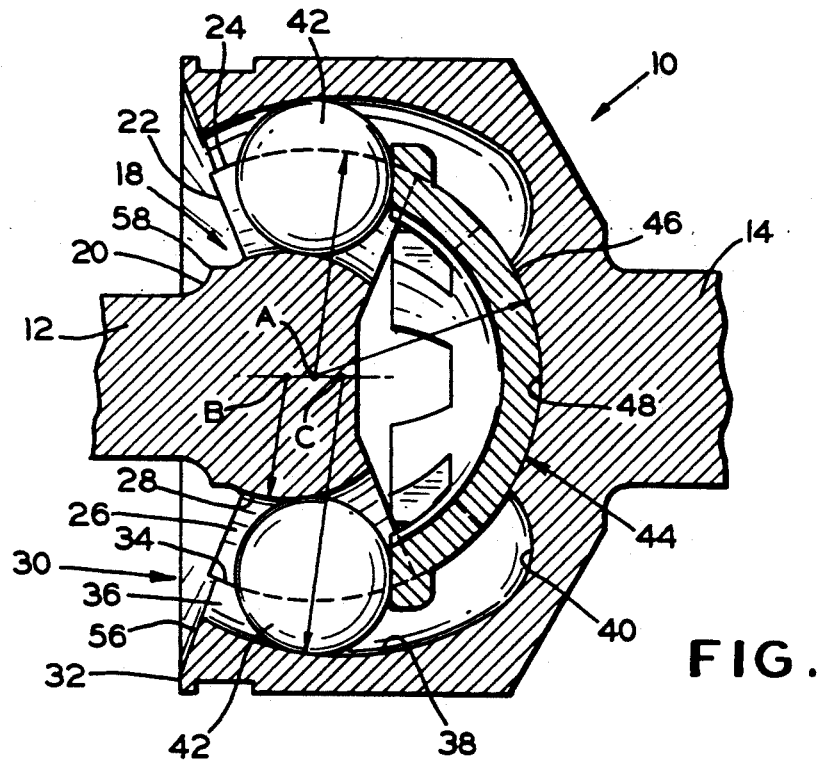
FIG. 2 is a greatly enlarged, fragmentary view in longitudinal cross section of the constant velocity universal joint of FIG. 1.
Figure 3:
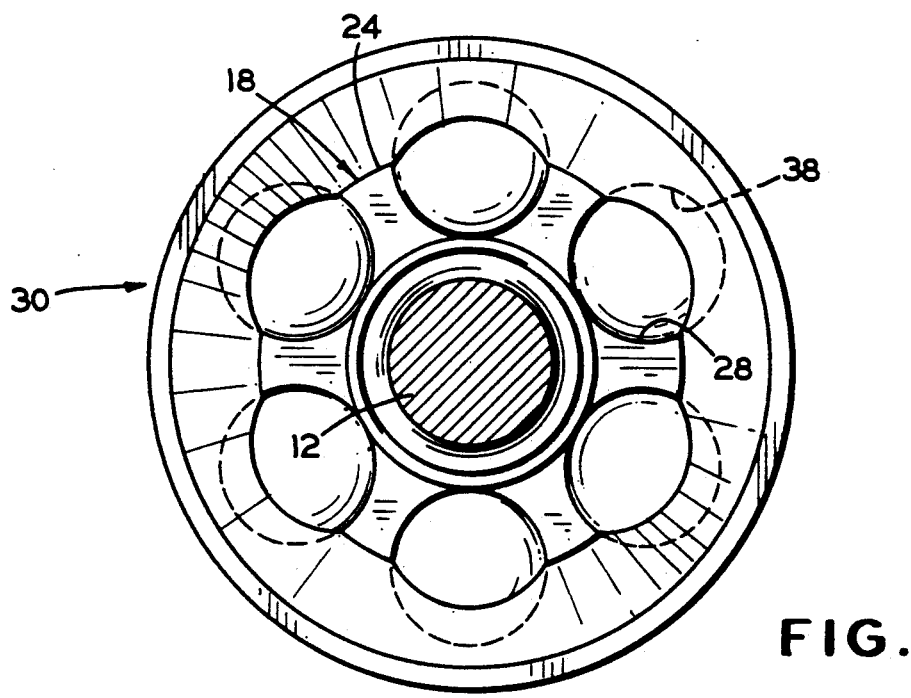
FIG. 3 is a tranverse view taken near the left end of the universal joint of FIG. 2.
Figure 4:
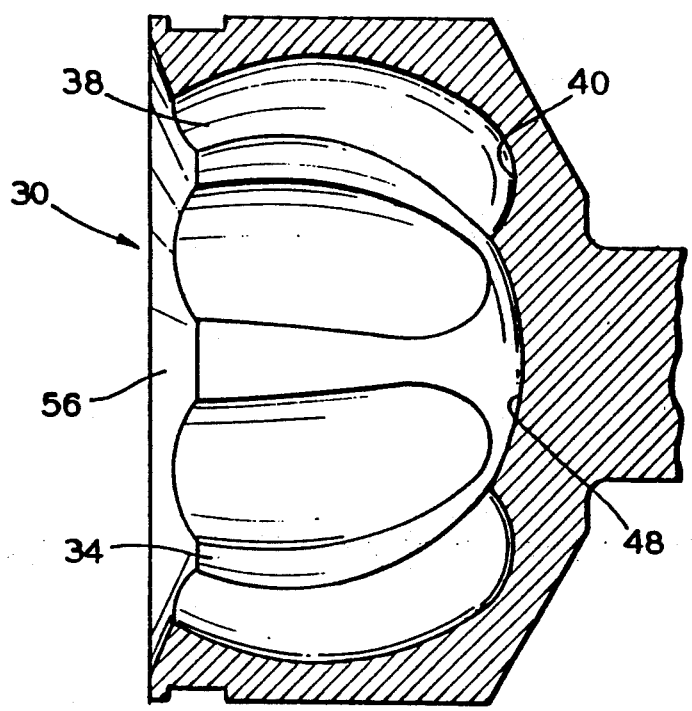
FIG. 4 is a view in longitudinal cross section of an outer race of the universal joint.

Referring to FIG. 2, the universal joint 10 includes an inner race 18 which is functionally and structurally integral with an outer end 20 of the shaft 12. The inner race 18 has a partially spherical body 22 with a partially spherical outer surface 24 having a center of curvature designated A on the axis of the shaft 12 and as indicated by an arrow. Six curved grooves 26 are equally spaced around the periphery of the inner race body 22. The grooves 26 have curved bottoms 28 which have a center of curvature designated B on the axis of the shaft 12 and as indicated by an arrow. The center of curvature B is spaced toward the inner end of the shaft 12 from the center of curvature A.

An outer race 30 has a generally cup-shaped body 32 which has a closed end that is structurally integral with the outboard shaft 14. The body 32 has a partially spherical inner surface 34 with the center of curvature also lying on the point A on the axis of the shaft 12. The radii of the partially spherical surfaces 24 and 34 of the inner race 18 and the outer race 30 are substantially equal so that a smooth, close fit is established therebetween, similar to a ball and socket. Six curved grooves 36 are equally spaced around the inner periphery of the outer race 30 in alignment with the grooves 26 of the inner race 18. The grooves 36 have curved bottoms 38 with a center of curvature C lying on the axis of the shaft 12 and as indicated by an arrow. The center C is spaced toward the outer end of the shaft 12 from the point A. The centers B and C are preferably equidistant from the center of curvature A. The grooves 36 also have end extensions 40 at the closed end of the outer race for assembly purposes, as will be discussed subsequently.

Rolling elements or balls 42 are located in the aligned grooves 26 and 36 to transmit torque from the shaft 12 to the inner race 18, the outer race 30, and the shaft 14. With these positions of the centers of curvature B and C for the groove bottoms 28 and 38, in the operation of the CV joint 10, the balls 42 tend to be urged or squeezed toward the closed end of the outer race body 32.

A cage or retainer 44 is employed to maintain the balls 42 in a plane which bisects the angle between the axes of the shafts 12 and 14 during operation of the joint. The retainer 44 has a central convex portion 46 of partially spherical configuration. This engages a central portion 48 of the inner surface 34 centrally located at the closed end of the outer race body 32 so that the portion 48 backs up and guides the movement of the retainer 44. The center of curvature of the surfaces 34 and 46 also lie on the point A and as indicated by an arrow.

Figure 6:
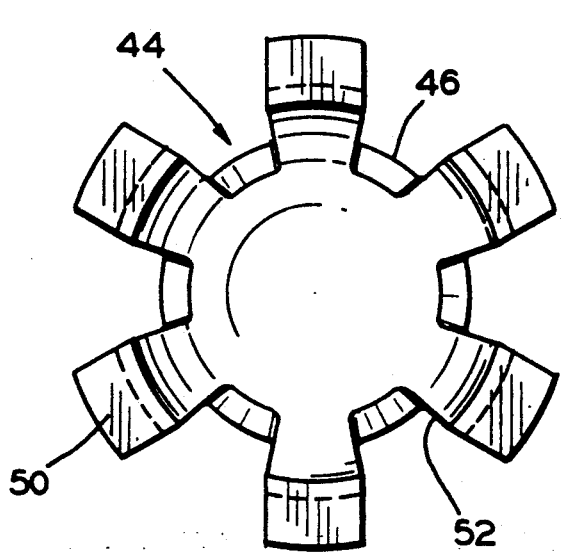
FIG. 6 is a front view of a retainer or cage employed in the universal joint.
Figure 7:
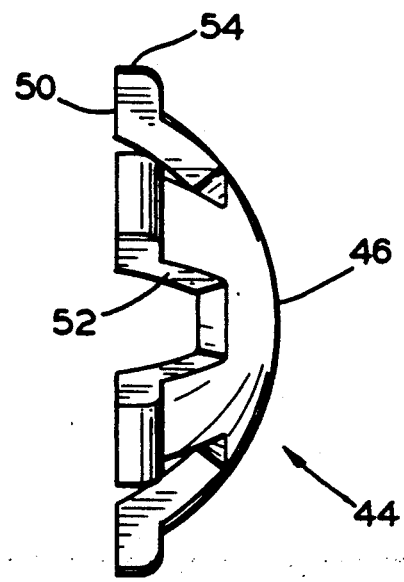
FIG. 7 is a side of the retainer or cage of FIG. 6.

As shown, particularly in FIGS. 6 and 7, the retainer 44 has six outwardly-extending fingers 50 which extend into the ends of the grooves 26 of the inner race 18 and abut the bearing balls 42 to retain them in proper position. The retainer 44 also has notches 52 between the fingers 50 to straddle the inner race body 22 between the grooves therein. As such, the retainer 44 is never positioned between the partially spherical, mating surfaces 24 and 34 of the inner and outer races 18 and 30. Thus, these partially spherical surfaces can have a closer fit than is otherwise possible. Consequently, with the constant velocity universal joint 10 in accordance with the invention, axial or other forces incurred during operation of the universal joint can be taken more directly between the inner and outer races.

The partially spherical inner surface 34, including the central portion 48 thereof, is of constant diameter throughout the outer race 30. This is made possible because the retainer 44 basically only extends into the grooves 26 of the inner race 18. Consequently, it is not necessary to have a stepped configuration for the outer race, as was heretofore true of the constant velocity universal joint of my earlier aforesaid application. This reduces the time and cost of manufacturing the universal joint 10, and specifically the outer race 30. The retainer 44 does have flanges or tabs 54 extending outwardly from the ends of the fingers 50. These extend into the grooves 36 of the outer race 30 but no special clearance is required for them. The flanges 54 provide extra width for the faces of the fingers 50 to assure contact between the retainer 44 and the balls 42 for all operating positions of the universal joint 10.

Figure 5:
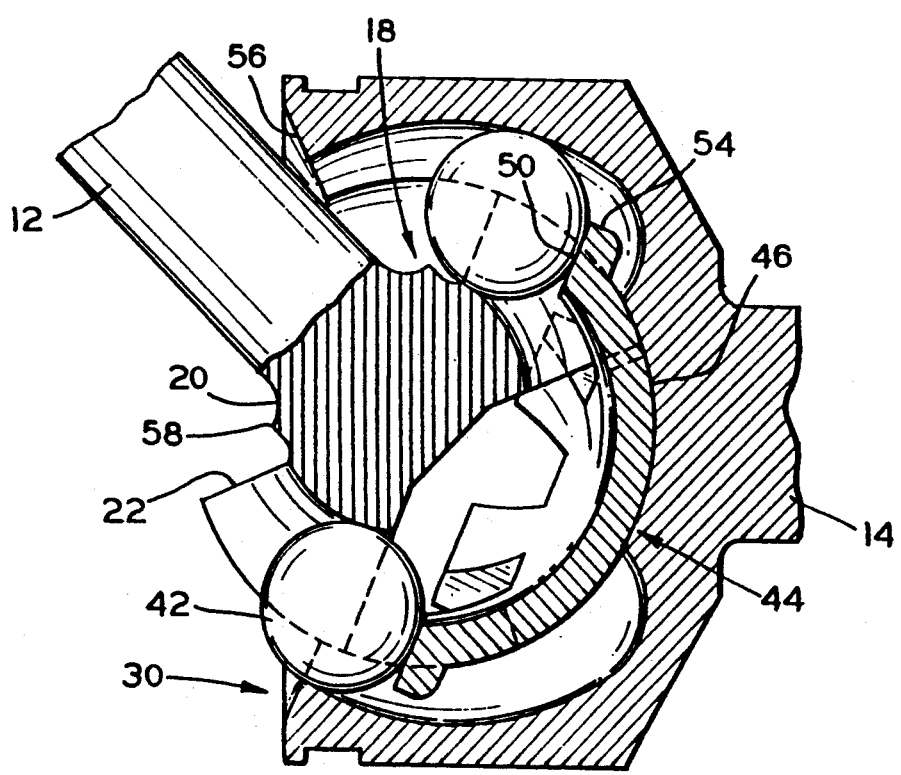
FIG. 5 is a view in cross section similar to FIG. 2 but showing one shaft of the universal joint at a maximum operating angle.

The universal joint 10 in FIG. 5 is shown in its maximum operating position with the axes of the shaft 12 being at a forty-five degree angle with the shaft axis when the shafts 12 and 14 are in alignment. In this position, the shaft 12 slightly clears an annular conical surface 56 on the edge of the outer race body 32.

The constant velocity universal joint 10 has both the inner race 18 and the outer race 30 structurally and functionally integral with their respective shafts 12 and 14. This design eliminates special splines on the first shaft and cooperating splines on the inner race and the separate steps of assembling and connecting the shaft and the inner race. Similar economics result by the integral outer race and shaft which eliminates separate parts, fasteners, and steps required for assembly when the outer race and shaft are separate.

Figure 8:
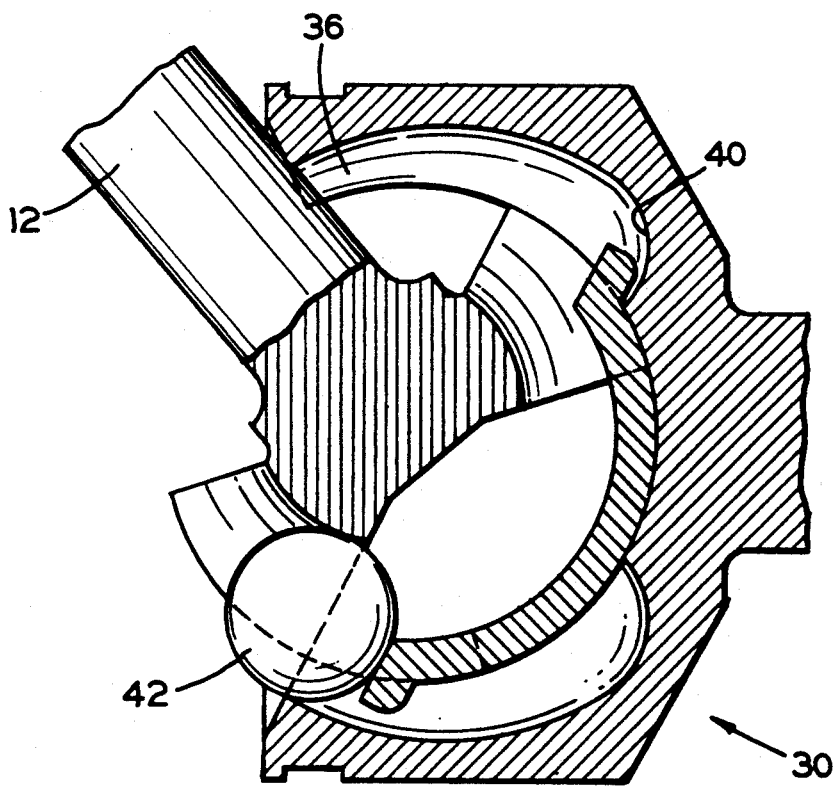
FIG. 8 is a somewhat schematic view similar to FIG. 5 but showing the one shaft at an angle beyond the maximum operating angle, for assembly purposes.

In order to initially assemble the races and their structurally-integral shafts, the diameter of the shaft 12 is designed not to exceed the diameter of the balls 42 so that the shaft 12 can be received in the ends of the grooves 36 of the outer race 30. With the shaft 12 in one of the ends of the grooves 36, as shown in FIG. 8, the angle between the shaft 12 and the shaft axis when the shafts 12 and 14 are in alignment exceeds the maximum operating angle for the universal joint 10. Thus, for example, the assembly angle of the shaft 12 in FIG. 8 is fifty degrees whereas the maximum operating angle of the shaft 12 is forty-five degrees, as shown in FIG. 5. To initiate assembly, the retainer 44 is placed in the outer race 30 with the surface 46 in contiguous relationship with the central portion 48 of the inner race surface 34. With the retainer in place, and with the shafts 12 and 14 roughly in alignment, the spherical surfaces 24 and 34 of the inner and outer races are aligned with the grooves 36 and 26 of the outer and inner races. The inner race body 22 is then moved into the outer race body 32 and the inner race is turned to place the grooves in alignment. The shaft is then turned so that a portion of it extends into the groove 36 (FIG. 8). This provides sufficient clearance between the opposite outer race groove and the corresponding inner race groove to enable the balls 42 to be placed into the grooves, one at a time, as the shaft 12 is moved out of one of the grooves 36 and into the next one. To accommodate the balls 42 and the flanges 54 of the retainer 44 at the assembly angle, the grooves of the outer race have the extensions 40. The extensions do not come into use during operation of the universal joint but are only for assembly purposes.

An annular shoulder or ridge 58 is formed at the juncture of the outer end 20 of the shaft 12 and the inner race body 22. This provides a thicker cross section then otherwise between the shaft end and the body. The shaft can be surface hardened in one heat-treatment and the inner race body 22 can be surface hardened in another heat-treatment. These leave a narrow space between the two heat-treated zones where the shoulder 58 occurs. The extra thickness of the shoulder 58 provides additional strength to make up for the lack of heat treatment in this narrow area.

Various modifications of the above-described embodiment of the invention will be apparent to those skilled in the art, and it is to be understood that such modifications can be made without departing from the scope of the invention, if they are within the spirit and the tenor of the accompanying claims.

I claim:

1. A method of assembling components of a constant velocity universal joint for connecting two shafts, said universal joint comprising a one-piece first shaft and inner race, said inner race having an outer surface of partially spherical configuration, a one-piece second shaft and outer race, said outer race having a closed end and an open end, said outer race having an inner surface of partially spherical configuration with the radius of the outer surface of said inner race being substantially equal to the radius of the inner surface of said outer race, whereby the outer surface of said inner race and the inner surface of said outer race fit closely together in the manner of a ball and socket, said inner race having a plurality of outwardly-facing grooves, said outer race having a plurality of inwardly-facing grooves, a cage having a convex outer surface, bearing balls for the corresponding grooves of said inner and outer races, said bearing balls having diameters slightly less than the diameters of said corresponding grooves, said method comprising placing said cage in said outer race with a portion of the convex outer surface of said cage being in contact with the inner surface of said outer race at the closed end thereof, placing said inner race in said outer race and rotating said inner race to align the grooves thereof with the grooves of said outer race, turning said inner race and first shaft so that a portion of said first shaft is received in an end portion of one of said grooves of said outer race at the open end thereof, and placing one of said bearing balls into corresponding grooves of said races opposite the groove into which said first shaft extends.

2. A method according to claim 1 characterized by pivoting said first shaft out of the groove into which it extended and into the next groove after placing said one bearing ball, placing a second of said bearing balls in the corresponding grooves opposite the groove of said outer race into which said first shaft now extends, and repeating the process until balls are inserted into all corresponding grooves of said inner and outer races.

* * * * *